(12) United States Patent
Khan et al.

(10) Patent No.: US 8,124,569 B2
(45) Date of Patent: Feb. 28, 2012

(54) CONTROL OF THE PROPERTIES OF CEMENT SLURRIES OF NORMAL DENSITIES WITH OPTIMIZED POLYMERS COMBINATION

(75) Inventors: Tariq Mehmood Khan, Paris (FR); Bernard Piot, Montrouge (FR); Siti Humairah Abd Rahman, Selangor (MY)

(73) Assignee: Schlumberger Technology Corporation, Sugar Land, TX (US)

( * ) Notice: Subject to any disclaimer, the term of this patent is extended or adjusted under 35 U.S.C. 154(b) by 270 days.

(21) Appl. No.: 12/499,870

(22) Filed: Jul. 9, 2009

(65) Prior Publication Data

US 2010/0018708 A1 Jan. 28, 2010

(30) Foreign Application Priority Data

Jul. 24, 2008 (EP) .................................... 08290728

(51) Int. Cl.
*C09K 8/42* (2006.01)
*C04B 7/19* (2006.01)

(52) U.S. Cl. ........ 507/216; 106/713; 106/714; 106/726; 106/727; 106/789; 106/819; 106/823; 507/209; 507/214; 507/225; 507/226; 507/269

(58) Field of Classification Search .................. 507/216, 507/209, 214, 225, 226, 269; 106/713, 714, 106/726, 727, 789, 819, 823
See application file for complete search history.

(56) References Cited

U.S. PATENT DOCUMENTS

| | | | | |
|---|---|---|---|---|
| 5,336,316 | A * | 8/1994 | Dawson et al. | 106/724 |
| 7,478,675 | B2 * | 1/2009 | Roddy et al. | 166/293 |
| 7,674,332 | B2 * | 3/2010 | Roddy et al. | 106/716 |
| 2003/0008779 | A1 | 1/2003 | Chen | |
| 2004/0226483 | A1 | 11/2004 | Chatterji | |
| 2004/0262000 | A1 | 12/2004 | Morgan | |

* cited by examiner

*Primary Examiner* — Timothy J. Kugel
(74) *Attorney, Agent, or Firm* — Myron Stout; David Cate; Robin Nava

(57) ABSTRACT

The invention discloses a cement slurry composition for cementing a well comprising: an hydraulic cement, water and a combination made of a cellulosic polymer and an acrylamido-methyl-propane sulfonate co- or ter-polymer, wherein the density of said cement slurry is above 1700 kg/m$^3$.

19 Claims, No Drawings

CONTROL OF THE PROPERTIES OF CEMENT SLURRIES OF NORMAL DENSITIES WITH OPTIMIZED POLYMERS COMBINATION

BACKGROUND OF THE INVENTION

This application claims the benefit of EP Patent Application 08290728.8 filed Jul. 24, 2008, entitled, "Control of the Properties of Cement Slurries of Normal Densities With Optimized Polymers Combination."

The statements in this section merely provide background information related to the present disclosure and may not constitute prior art.

The present invention broadly relates to well cementing. More particularly the invention relates to cementing compositions comprising a mixture of cellulosic polymer and AMPS monomer based polymer as well as methods for using such compositions to service a wellbore.

When a well such as an oil or gas well has been drilled, it is often desired to isolate the various producing zones from each other or from the well itself in order to stabilize the well or prevent fluid communication between the zones or shut off unwanted fluid production such as water. This isolation is typically achieved by installing a tubular casing in the well and filling the annulus between the outside of the casing and the wall of the well (the formation) with cement. The cement is usually placed in the annulus by pumping slurry of the cement down the casing such that it exits at the bottom of the well and passes back up the outside of the casing to fill the annulus. Various additives can be added to the cement to enhance properties of the slurry or of the set cement, for example fluid-loss control agent, foaming agent, dispersant, retarder, and/or accelerator.

Hydroxyethyl celluloses (HEC) have been used for many years as fluid-loss control agents in oilwell cement slurries. As such, various grades having different molecular weight and ethoxylation (degree of substitution and molar substitution) cover slightly different ranges of application in terms of temperature and slurry density. They all suffer from viscosifying and retarding too much the cement slurry, thus their use is limited to temperatures typically lower than 85° C. and to lighter weight slurries. By way of examples, a low molecular-weight HEC, is used as a fluid-loss control agent in cement slurries having a Solid Volume Fraction (SVF) of about 35% to about 60%. A low/medium molecular-weight HEC is used as a fluid-loss control agent in cement slurries having a SVF of about 20% to about 30% (i.e., extended slurries). And a high molecular-weight HEC, is primarily used as an extender in extended cement slurries. Last one also provides some fluid-loss control.

Also, co- or ter-polymer containing AMPS and one or several vinyl or acrylic co-monomers (like Acrylic acid, Methacrylic acid, Acrylamide, NN dimethylacrylamide, N vinylpyrrolidone, NN dimethylformamide, N-vinyl-N-methylacetamide, ACMO . . . ) have been initially developed in the early 1980's and improved in the late 1990's/early 2000's. These synthetic polymers can be either long chain polymers or short-chain elements grafted onto a natural polymeric backbone (tannin, humic acid, causticized lignite . . . ) for improving the ecotox properties. These synthetic polymers are much more expensive than the HEC derivatives and are supposed to provide fluid loss control at much higher temperatures. However some of these synthetic polymers also viscosify significantly the cement slurries, which limit seriously their temperature range. Other synthetic polymers on the other hand does induce severe slurry instability and particle settling.

US2004/262000 discloses a method for cementing in a subterranean formation providing a inter alia an acrylamide copolymer and a hydratable polymer. The ratio copolymer to hydratable polymer varies between 10:1 to 22:1. Then, US2003/008779 relates to a well treating fluid comprising an interjacent polymer complex which is made of HEC and a water soluble polymer at least partially derived from 2-acrylamido-2-methyl propane sulfonic acid. Another patent application, US2004/226483, aims at a cement composition containing the interjacent polymer of US2003/008779.

Therefore, a solution to decouple the fluid-loss control and the slurry viscosity is needed for cement slurry and particularly one, which would be effective over a large range of temperatures, which would allow a reduced concentration in AMPS and which would not imply a lengthy process such as forming an interjacent complex polymer.

SUMMARY OF THE INVENTION

According to the invention, a cement slurry composition is disclosed comprising an hydraulic cement, water and a combination made of a cellulosic polymer and an acrylamido-methyl-propane sulfonate co- or ter-polymer, wherein the density of said cement slurry is above 1700 kg/m$^3$. In a preferred embodiment, the cellulosic polymer is a hydroxyethyl cellulose and/or the acrylamido-methyl-propane sulfonate copolymer is a acrylamido-methyl-propane sulfonate—acrylamide copolymer.

This combination of polymers can be used with all Portland cements, whether ISO/API Class A, C, G and H cements or not, and with all types of pozzolanic or slag cements (Portland cement blended with pozzolanic materials such as fly ash, blast-furnace slag, calcined clay, diatomaceous earth, silica fume, microsilica . . . etc). Excellent performances can be obtained over a wide temperature range and wide slurry density range. Preferably, the slurry has a density above 1800 kg/m$^3$. More preferably, the density is between 1800 kg/m$^3$ to 2050 kg/m$^3$. Preferably, the hydraulic cement is a pozzolanic cement. The system of the invention provides better fluid-loss control with this type of cement.

In a preferred embodiment, the hydroxyethyl cellulose has a molecular weight between 500,000 and 2,000,000 and preferably between 800,000 and 1,600,000, a concentration by weight of cement between 0.1% to 0.8% and the AMPS—Acrylamide copolymer has a molecular weight between 600,000 and 1,000,000, a concentration by weight of cement between 0.1% to 1%. Preferably, the hydroxyethyl cellulose to acrylamido-methyl-propane sulfonate polymer ratio varies between 5:1 to 1:5.

In another aspect a method of cementing a well comprising the step of pumping a cement slurry as disclosed previously is divulged. The method can apply to well temperature varying between from 20° C. to up to 150° C. The method can further comprises the step of drilling the well and running a casing, wherein the step of cementing applies to cement the casing.

The method can further comprises the step of drilling, and optionally casing, a first section of the well, optionally drilling a second section of the well, running a string of drill pipe or tubing and pumping a cement slurry as previously presented for curing losses.

The method can further comprises the step of drilling, and optionally casing, a first section of the well, optionally drilling a second section of the well, running a string of drill pipe or tubing and pumping a cement slurry as previously presented for temporarily or permanently abandoning a zone.

The method can further comprises the step of drilling and casing the various sections of a well, producing the fluids from a subterranean reservoir, and pumping a cement slurry as previously presented for abandoning the section once it is not economical anymore to produce.

The method can further comprises the step of drilling and casing the various sections of a well, evaluating the isolation of the respective intervals, perforating the casing and running a string of drill pipe or tubing and pumping a cement slurry as previously presented for repairing a lack of isolation from the primary cementing operation.

DETAILED DESCRIPTION

For a more complete understanding of the present invention, and the advantages thereof, reference is now made to the following descriptions.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein may also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

The cement slurry composition of the invention comprises: an hydraulic cement, water and a combination made of a cellulosic polymer and an acrylamido-methyl-propane sulfonate co- or ter-polymer, wherein the density of said cement slurry is above 1700 kg/m$^3$. The combination is formed just by blending; there is no need according to the present invention to form any polymer complex. This allow a much easier process compared to solution available in the art while maintaining a very high performance. Hydraulic cements used can be ISO/API Class A, C, G and H cements. Pozzolanic cements are preferred (i.e., Portland cement blended with fly ash, calcined clay, blast-furnace slag, silica fume, or diatomaceous earth). Current invention is based on combination of two selected water-soluble polymers in a cement slurry allowing to decouple the slurry rheology from the fluid-loss rate, whilst bringing down significantly the overall cost of the slurry.

The first polymer is a HEC, CMHEC, CMC, hydrophobically modified HEC, EHEC, MC, HPC, MHEC. Preferably, the first polymer is a hydroxyethyl cellulose (HEC) of relatively high molecular weight around 1,200,000.

The second polymer is an acrylamido-methyl-propane sulfonate co- or ter-polymer, taken in the non exhaustive list of: 2-acrylamido-2-methylpropane sulfonic acid/N,N-dimethylacrylamide/$C_6$-$C_{22}$ dimethylaminopropylmethacrylamide bromide, chloride or iodide; 2-acrylamido-2-methylpropane sulfonic acid/acrylamide/$C_6$-$C_{22}$ dimethylaminopropylmethacrylamide bromide, chlorine or iodide; 2-acrylamido-2-methylpropane sulfonic acid/N-vinylpyrrolidone/$C_6$-$C_{22}$ dimethylaminopropylmethacrylamide bromide, chloride or iodide; 2-acrylamido-2-methylpropane sulfonic acid/N-vinylacetamide/$C_6$-$C_{22}$ dimethylaminopropylmethacrylamide bromide, chloride or iodide; 2-acrylamido-2-methylpropane sulfonic acid/acrylonitrile/$C_6$-$C_{22}$ dimethylaminopropylmethacrylamide bromide, chloride or iodide; 2-acrylamido-2-methylpropane sulfonic acid/N,N-dimethylacrylamide/$C_6$-$C_{22}$ dimethylaminoethyl-methacrylate bromide, chloride or iodide; 2-acrylamido-2-methylpropane sulfonic acid/acrylamide/$C_6$-$C_{22}$ dimethylaminoethylmethacrylate bromide, chloride and iodide; 2-acrylamido-2-methylpropane sulfonic acid/N-vinylpyrrrolidone/$C_6$-$C_{22}$ dimethylaminoethylmethacrylate bromide, chloride or iodide; 2-acrylamido-2-methylpropane sulfonic acid/N-vinylacetamide/$C_6$-$C_{22}$ dimethylaminoethylmethacrylate bromide, chloride or iodide; 2-acrylamido-2-methylpropane sulfonic acid/acrylonitrile/$C_6$-$C_{22}$ dimethylaminoethylmethacrylate bromide, chloride and iodide; 2-allyloxy-2-hydroxy-1-propane sulfonic acid/N,N-dimethylacrylamide/$C_6$-$C_{22}$ dimethylaminopropylmethacrylamide bromide, chloride or iodide; 2-allyloxy-2-hydroxy-1-propane sulfonic acid/acrylamide/$C_6$-$C_{22}$ dimethylaminopropylmethacrylamide bromide, chloride or iodide; 2-allyloxy-2-hydroxy-1-propane sulfonic acid/N-vinylpyrrolidone/$C_6$-$C_{22}$ dimethylaminopropylmethacrylamide bromide, chloride or iodide; 2-allyloxy-2-hydroxy-1-propane sulfonic acid/N-vinylacetamide/$C_6$-$C_{22}$ dimethylaminopropylmethacrylamide bromide, chloride or iodide; 2-allyloxy-2-hydroxy-1-propane sulfonic acid/acrylonitrile/$C_6$-$C_{22}$ dimethylaminopropylmethacrylamide bromide, chloride or iodide; vinylphosphonic acid/N,N-dimethylacrylamide/$C_6$-$C_{22}$ dimethylaminopropylmethacrylamide bromide, chloride or iodide; vinylsulfonic acid/acrylamide/$C_6$-$C_{22}$ dimethylaminopropylmethacrylamide bromide, chloride or iodide; vinylsulfonic acid/N-vinylpyrrolidone/$C_6$-$C_{22}$ dimethylaminopropylmethacrylamide bromide, chloride or iodide; vinylsulfonic acid/N-vinylacetamide/$C_6$-$C_{22}$ dimethylaminopropylmethacrylamide bromide, chloride or iodide; vinylsulfonic acid/acrylonitrile/$C_6$-$C_{22}$ dimethylaminopropylmethacrylamide bromide, chloride or iodide; 2-allyloxy-2-hydroxy-1-propane sulfonic acid/N,N-dimethylacrylamide/$C_6$-$C_{22}$ dimethylaminoethylmethacrylate bromide, chloride or iodide; 2-allyloxy-2-hydroxy-1-propane sulfonic acid/acrylamide/$C_6$-$C_{22}$ dimethylaminoethylmethacrylate bromide, chloride or iodide; 2-allyloxy-2-hydroxy-1-propane sulfonic acid/N-vinylpyrrolidone/$C_6$-$C_{22}$ dimethylaminoethylmethacrylate bromide, chloride or iodide; 2-allyloxy-2-hydroxy-1-propane sulfonic acid/N-vinylacetamide/$C_6$-$C_{22}$ dimethylaminoethylmethacrylate bromide, chloride or iodide; 2-allyloxy-2-hydroxy-1-propane sulfonic acid/acrylonitrile/$C_6$-$C_{22}$ dimethylaminoethylmethacrylate bromide, chloride or iodide; vinylsulfonic acid/N,N-dimethylacrylamide/$C_6$-$C_{22}$ dimethylaminoethylmethacrylate bromide, chloride or iodide; vinylsulfonic acid/acrylamide/$C_6$-$C_{22}$ dimethylaminoethylmethacrylate bromide, chloride or iodide; vinylsulfonic acid/N,N-vinylpyrrolidone/$C_6$-$C_{22}$ dimethylaminoethylmethacrylate bromide, chloride or iodide; vinylsulfonic acid/N-vinylacetamide/$C_6$-$C_{22}$ dimethylaminoethylmethacrylate bromide, chloride or iodide; and vinylsulfonic acid/acrylonitrile/$C_6$-$C_{22}$ dimethylaminoethylmethacrylate bromide, chloride or iodide. Preferably, the second polymer is acrylamido-methyl-propane sulfonate-acrylamide copolymer with a molecular weight around 850,000.

The hydroxyethyl cellulose is at a concentration by weight of cement between 0.1% to 0.8% and the AMPS—Acrylamide copolymer is at a concentration by weight of cement between 0.1% to 1%. The total concentration of both polymers varies by weight of cement between 0.4% to 1.6%. The HEC to AMPS polymer ratio can vary between 5:1 to 1:5 depending on temperature.

The cement slurry composition of the invention can further comprise other additional additives: antifoam, dispersant, retarder as required. The cement slurry composition of the invention can further comprise silica, preferably the silica is present in an amount of 35% BWOC.

Regardless of the cement type, excellent fluid-loss control can easily be achieved at slurry density above 1700 kg/m$^3$. More specifically, cement slurry composition of the invention are in the range of densities between 1700 kg/m$^3$ up to 2050 kg/m$^3$.

In another aspect of the invention, it is referred to a method of cementing a well comprising the step of pumping a cement slurry as disclosed herewith. This combination of polymers can be used to cement a well with very wide range of temperatures: from 20° C. to up to 150° C. The range of cementing temperatures applies not only from ambient to temperature around 100° C., but also to wells with higher cementing temperatures up to 150° C.

In another aspect of the invention, use of the above slurry is described for cementing a well wherein the well temperature is above 110° C.

Copolymers based on AMPS are well known fluid loss controlling additives used over wide range of temperatures in cement slurries for oil well cementing, particularly for temperatures above 93 deg C. and up to 149 deg C. Since AMPS is an expensive monomer, cost of cement slurry increases significantly if AMPS co-polymers are used to control fluid loss. Apart from high cost, AMPS co-polymer that may be used at high temperatures, have another disadvantage which is their dispersing effect from 93 deg C. to 149 deg C. If used alone, these AMPS polymers can cause severe sedimentation in the slurry and make cement slurry unstable. Therefore, most of the times, AMPS copolymers need antisettling agents to stabilize cement slurries.

The principal objective of the invention is to minimize the cost without jeopardizing the fluid loss control property and eliminate or minimize the requirement for antisettling agent. Therefore, it has been proposed to blend very effective AMPS copolymer with HEC, where HEC acts as suspending agent whilst also controlling the fluid loss. Being a lower cost polymer, it helps bringing down significantly the overall cost of the slurry.

The following examples serve to further illustrate the invention. The materials used in the examples are commonly available and used in the well cementing industry.

EXAMPLES

In a first part of experiment, tests were performed using HEC and AMPS copolymer at different ratios to find a suitable ratio to be blended and that can cover a wide temperature range. Ratios of HEC to AMPS copolymer tested in slurries were HEC:AMPS copolymer 5:1, 5:2, 5:3, 4:1 and 4:2 in the range between 5:1 to 1:5. After several tests, 4:1 HEC to AMPS copolymer by weight was found an optimum ratio to cover a wide range of temperature and cost effective.

In a second part of experiment, preferred HEC:AMPS copolymer (4:1) blend was prepared and tests were performed at temperatures ranging from 49 deg C. to 121 deg C. using Red Label class G cement from Dyckerhoff AG, tap water and other additives commercially available. Tests are presented in the following tables.

Table 1 shows results with a slurry density of 1890 kg/m$^3$ made with Red Label class G cement from Dyckerhoff AG at 49 deg C.:

TABLE 1

Results at 49 deg C.

| | Example | | |
|---|---|---|---|
| | A | B | C |
| Antifoam agent (L/tonne) | 0.45 | 0.45 | 0.45 |
| HEC:AMPS copolymer % BWOC Blend | | | 0.35 |
| HEC (% BWOC) | 0.45 | | |
| AMPS copolymer (% BWOC) | | 0.25 | |
| Dispersant 1 (% BWOC) | 0.4 | 0.15 | 0.3 |
| PV (mPa · s) after mixing | 264.5 | 96.6 | 120 |
| Ty (Pa) after mixing | 16.5 | 5.8 | 5.2 |
| PV (mPa · s) after conditioning | 157.2 | 74.1 | 81 |
| Ty (Pa) after conditioning | 6.7 | 4.6 | 2.9 |
| Fluid Loss at 49 deg C. | 46 | 54 | 52 |
| Thickening Time | 6:04[1] | | 4:51[2] |
| UCA 12 hrs CS | | | 1006 |
| UCA 24 hrs CS | | | 2253 |

At 49 deg C., control of fluid loss was relatively easy and a fluid loss of ±50 mL was achieved with HEC, AMPS copolymer and HEC: AMPS copolymer blend. There was no significant difference in cost of slurries prepared with HEC or HEC:AMPS copolymer blend. However cost of slurry prepared with AMPS copolymer was 3% higher.

Although cost of slurries prepared with HEC and HEC:AMPS copolymer blend was almost same, HEC:AMPS copolymer blend had some advantages over HEC at 49 deg C. Lower concentrations of Blend was required to obtain same level of fluid loss control, lower rheology and shorter thickening Time were obtained with HEC:AMPS copolymer blend (No over-retardation).

Table 2 shows results with a slurry density of 1890 kg/m$^3$ made with Red Label class G cement from Dyckerhoff AG at 71 deg C.:

TABLE 2

Results at 71 deg C.

| | Example | | |
|---|---|---|---|
| | D | E | F |
| Antifoam agent L/tonne | 0.45 | 0.45 | 0.45 |
| HEC:AMPS copolymer % BWOC Blend | | | 0.4 |
| HEC (% BWOC) | 0.6 | | |
| AMPS copolymer (% BWOC) | | 0.35 | |
| Dispersant 1 (% BWOC) | 0.4 | 0.25 | 0.3 |
| Retarder 1 (% BWOC) | 0.1 | 0.1 | 0.1 |
| PV (mPa · s) after mixing | 217 | 82.89 | 195 |
| Ty (Pa) after mixing | 30.1 | 1.05 | 10.5 |
| PV (mPa · s) after conditioning | 176 | 74.9 | 108 |
| Ty (Pa) after conditioning | 17 | 2.2 | 9.1 |
| Fluid Loss at 71 deg C. | 60 | 56 | 56 |
| Thickening Time (100 BC) | | | 6:26[4] |

At 71 deg C., a fluid loss of ±50 mL was achieved using HEC, AMPS copolymer and with blend of HEC:AMPS copolymer.

In terms of cost slurries prepared with HEC and HEC: AMPS copolymer blend were not very much different. However rheology was much higher in slurries prepared with HEC alone. Slurry prepared with AMPS copolymer had good properties but it was 22% more expensive.

Table 3 shows results with a slurry density of 15.8 lbs/gal (1890 kg/m$^3$ made with Cement Dyckerhoff Red Label at 85 deg C.:

TABLE 3

Results at 85 deg C.

| | Example | |
|---|---|---|
| | G | H |
| Antifoam agent (L/tonne) | 0.45 | 0.45 |
| HEC:AMPS copolymer Blend (% BWOC) | | 0.5 |
| HEC (% BWOC) | | |
| AMPS copolymer (% BWOC) | 0.45 | |
| Dispersant 1 (% BWOC) | 0.35 | 0.2 |
| Retarder 2 (% BWOC) | 0.2 | 0.2 |
| PV (mPa · s) after mixing | 101.9 | 253 |
| Ty (Pa) after mixing | 3.7 | 16.2 |
| PV (mPa · s) after conditioning | 78.7 | 95 |
| Ty (Pa) after conditioning | 2.7 | 7.2 |
| Fluid Loss at 85 deg C. | 56 | 54 |
| TT (100 BC) | | 3:25 |
| CS 12 hrs (MPa) | | 12.17 |
| CS 24 hrs (MPa) | | 16.8 |

At 85 deg C., a fluid loss of ±50 ml was obtained with AMPS copolymer and with HEC:AMPS copolymer blend. Good slurry rheology and other properties were obtained. However slurry prepared with AMPS copolymer was 35.5% more expensive than slurry prepared with HEC: AMPS copolymer blend.

With HEC alone, several systems were tried but slurries were very thick and it was difficult to measure rheology.

Table 4 shows results with a slurry density of 1890 kg/m$^3$ made with Red Label class G cement from Dyckerhoff AG at 110 deg C.:

TABLE 4

Results at 110 deg C.

| | Example | | |
|---|---|---|---|
| | I | J | K |
| Silica (% BWOC) | 35 | 35 | 35 |
| Antifoam agent (L/tonne) | 0.45 | 0.45 | 0.45 |
| HEC:AMPS copolymer Blend (% BWOC) | | 0.5 | 0.6 |
| HEC (% BWOC) | | | |
| AMPS copolymer (% BWOC) | 0.5 | | 0.1 |
| Dispersant 1 (% BWOC) | 0.4 | 0.5 | |
| Dispersant 2 (% BWOC) | | | 0.2 |
| Sodium silicate (L/tonne) | | 8.9 | |
| Retarder 3 (% BWOC) | 0.15 | 0.15 | 0.15 |
| Antisettling agent (% BWOC) | 0.15 | | |
| PV (mPa · s) after mixing | 136 | 263 | 318 |
| Ty (Pa) after mixing | 2.3 | 17.2 | 16.7 |
| PV (mPa · s) after conditioning | 65.4 | 149 | 87 |
| Ty (Pa) after conditioning | 1.8 | 5.7 | 1.9 |
| Fluid Loss at 85 deg C. | 58 | 60 | 40 |
| TT (100 BC) | | 7:56 | 6:04 |

At 110 deg C., HEC alone could not be used as fluid loss control additive. Slurry prepared with AMPS copolymer alone was good at controlling fluid loss with good rheology. HEC:AMPS copolymer blend was tested with and without sodium silicate and different behavior was observed. With sodium silicate, lower amount of blend was required to control the fluid loss and slurry was very cost effective. Without addition of sodium silicate, HEC:AMPS copolymer blends needed to be complemented with 0.1% bwoc of AMPS copolymer to get same level of fluid loss.

In terms of cost, slurry prepared with AMPS copolymer was 20% more expensive than slurry prepared with HEC: AMPS copolymer blend with silicate additive. And slurry with HEC:AMPS copolymer blend without silicate additive was 10% more expensive than slurry with silicate additive.

Table 5 shows results with a slurry density of 1890 kg/m$^3$ made with Red Label class G cement from Dyckerhoff AG at 121 deg C.:

TABLE 5

Results at 121 deg C.

| | Example | |
|---|---|---|
| | L | M |
| Silica (% BWOC) | 35 | 35 |
| Antifoam agent (L/tonne) | 0.45 | 0.45 |
| HEC:AMPS copolymer Blend (% BWOC) | | 0.4 |
| HEC (% BWOC) | | |
| AMPS copolymer (% BWOC) | 0.6 | 0.1 |
| Dispersant 1 (% BWOC) | 0.4 | 0.5 |
| Antisettling agent (% BWOC) | 0.2 | 0.1 |
| Sodium silicate (L/tonne) | | 8.9 |
| Retarder 3 (% BWOC) | 0.22 | 0.22 |
| PV (mPa · s) after mixing | 138.43 | 192.9 |
| Ty (Pa) after mixing | 2.3 | 15.2 |
| PV (mPa · s) after conditioning | 60.9 | 79.77 |
| Ty (Pa) after conditioning | 2.4 | 1.0 |
| Fluid Loss at 85 deg C. | 56 | 64 |
| TT (100 BC) | | 4:22 |

At 121 deg C. slurry prepared with HEC:AMPS copolymer blend required to be supplemented with 0.1% by weight of cement (BWOC) of AMPS copolymer to have reasonable fluid loss control. Sodium silicate was added to suppress the gelation observed during thickening time. Slurry prepared with AMPS copolymer was 22.7% more expensive than slurry prepared with AMPS copolymer.

The invention claimed is:

1. A cement slurry composition for cementing a well comprising: an hydraulic cement, water and a combination made of a cellulosic polymer and an acrylamido-methyl-propane sulfonate co- or ter-polymer, wherein the density of said cement slurry is above 1700 kg/m$^3$ and wherein the ratio cellulosic polymer to acrylamido-methyl-propane sulfonate polymer varies between 5:1 to 1:5.

2. The slurry of claim 1, wherein the cellulosic polymer is a hydroxyethyl cellulose.

3. The slurry of claim 2, wherein the hydroxyethyl cellulose is at a concentration by weight of cement between 0.1% to 0.8%.

4. The slurry of claims 2, wherein the hydroxyethyl cellulose to acrylamido-methyl-propane sulfonate polymer ratio varies between 5:1 to 1:5.

5. The slurry according to claim 1, wherein the acrylamido-methyl-propane sulfonate copolymer is a acrylamido-methyl-propane sulfonate—acrylamide copolymer.

6. The slurry of claim 5, wherein the acrylamido-methyl-propane sulfonate—acrylamide copolymer is at a concentration by weight of cement between 0.1% to 1%.

7. The slurry according to claim 1, where the hydraulic cement is Portland cement.

8. The slurry according to claim 7, wherein the density of said cement slurry is above 1800 kg/m³.

9. The slurry according to claim 1, where the hydraulic cement is a blend of a pozzolanic material and/or blast furnace slag and Portland cement.

10. The slurry according to claim 1, further comprising silica.

11. The slurry of claim 10, wherein silica is present in an amount of 35% by weight of cement.

12. A method of cementing a well comprising the step of pumping a cement slurry composition comprising: an hydraulic cement, water and a combination made of a cellulosic polymer and an acrylamido-methyl-propane sulfonate co- or ter-polymer, wherein the density of said cement slurry is above 1700 kg/m³ and the ratio cellulosic polymer to acrylamido-methyl-propane sulfonate polymer varies between 5:1 to 1:5.

13. The method of claim 12, wherein the well temperature varies between from 20° C. to up to 150° C.

14. The method of claim 12, further comprising the step of drilling the well and running a casing, wherein the step of cementing applies to cement the casing.

15. The method of claim 12, further comprising the step of drilling, and casing, a first section of the well, drilling a second section of the well, running a string of drill pipe or tubing and pumping the cement slurry for curing losses.

16. The method of claim 12, further comprising the step of drilling, and casing, a first section of the well, drilling a second section of the well, running a string of drill pipe or tubing and pumping the cement slurry for temporarily or permanently abandoning a zone.

17. The method of claim 12, further comprising the step of drilling and casing the various sections of a well, producing the fluids from a subterranean reservoir, and pumping the cement slurry for abandoning the section once it is not economical anymore to produce.

18. The method of claim 12, further comprising the step of drilling and casing the various sections of a well, evaluating the isolation of the respective intervals, perforating the casing and running a string of drill pipe or tubing and pumping the cement slurry for repairing a lack of isolation from the primary cementing operation.

19. Method according to claim 12 for cementing a well wherein the well temperature is above 110° C.

* * * * *